H. LUFT.
FAUCET.
APPLICATION FILED JAN. 14, 1914. RENEWED FEB. 16, 1915.
1,135,907.
Patented Apr. 13, 1915.
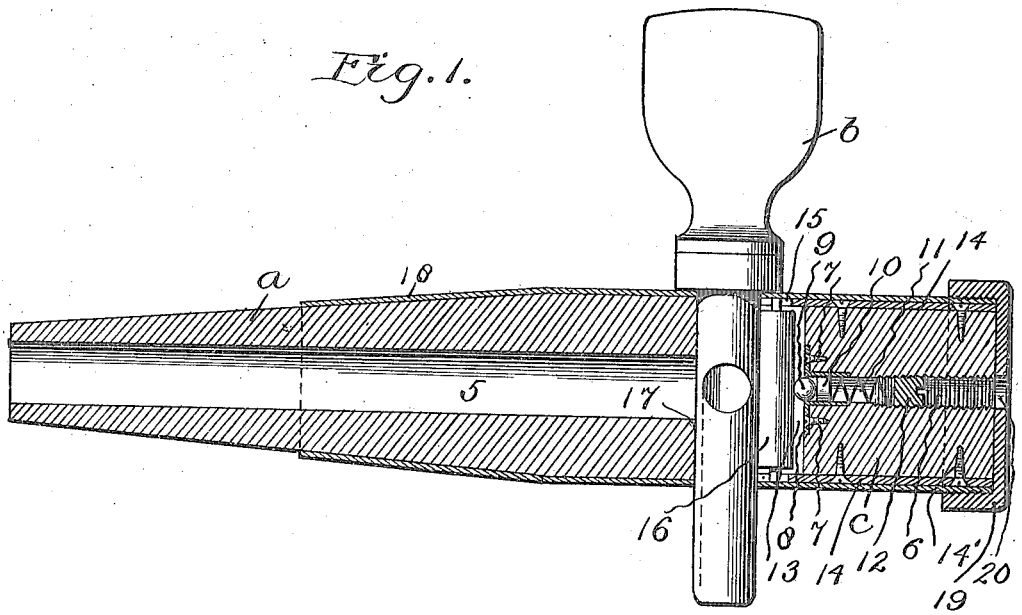
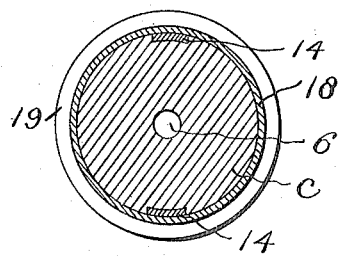
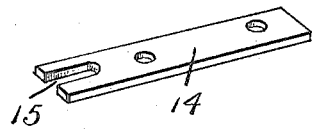
Witnesses
C. James Cronin
M. E. Laughlin
Inventor
Henry Luft
By Victor J. Evans
Attorney

UNITED STATES PATENT OFFICE.

HENRY LUFT, OF NEW YORK, N. Y.

FAUCET.

1,135,907. Specification of Letters Patent. Patented Apr. 13, 1915.

Application filed January 14, 1914, Serial No. 812,089. Renewed February 16, 1915. Serial No. 8,616.

*To all whom it may concern:*

Be it known that I, HENRY LUFT, a citizen of the United States, residing at New York city, in the county of New York and State of New York, have invented new and useful Improvements in Faucets, of which the following is a specification.

The general object of the invention is to improve in point of leakage and cracking, that class of faucets or spigots used generally in the wine and liquor trade. The faucet or spigot used in this line is preferably constructed of wood. This is due to the fact that the various properties embodied in wines, vinegars and the like liquors, quickly corrode metals, and obviously metal faucets cannot be used. In the case of wooden faucets the interior part thereof and the cock are always moist from constant use. The action of the drying of this moisture soon contracts the cock or key of the faucet, and the fitting of the same with the faucet becomes imperfect and leakage of the wines or liquors soon occurs.

My invention corrects this imperfection and consists of a tensioned element bearing against the cock of the faucet and rotatably mounted, whereby to obviate the friction caused by the turning of the cock.

Other objects will appear and be better understood from that embodiment of my invention of which the following is a specification, reference being had to the accompanying drawings forming part hereof, in which:—

Figure 1 is a longitudinal view of the invention partly in elevation and partly in section. Fig. 2 is a vertical cross sectional view taken on the line 2—2 of Fig. 1. Fig. 3 is a detail perspective view of the guide plate for retaining the tightening means.

The faucet consists of a shank portion *a* adapted to receive the usual cock or key *b*. The shank is cylindrical in shape and has one end tapered to admit of the faucet being inserted in the tap-hole of the wine or liquor keg. The wine or liquor passes through the bore 5 into the cock *b* whence it is directed downwardly.

The end portion *c* of the shank is provided with a bore 6, screw-threaded for a portion of its length adjacent to the outer end. Secured to the inner end of the bore 6, by the screws 7, is a flanged lining 8. This lining is formed preferably of metal and is of sufficient length to house the ball 9 and the follower 10. A spring 11 projects the ball outwardly by means of the follower and is tensioned by means of the screw 12.

At the inner end of the bore 6 is a vertically disposed recess 13. Over the ends of this recess 13 is a plate 14, which is secured by the screws 14′ to the portion 6 and is flush with the periphery thereof. Slots 15 are provided in the plate which are in alinement with the recess 13. A roller 16 is journaled in these slots and is normally caused to bear against the cock *b* by virtue of the spring 11 projecting the ball 9 thereagainst. Thus it will be seen that any reduction in diameter of the cock and any space between the cock and cock seat 17 arising from the aforementioned contraction, will be compensated by means of the roller 16 bearing against the cock, which action will cause the cock to be in close contact with the cock seat 17; and the leakage of the contained liquor will be prevented.

A casing 18 is provided whereby to protect the exterior of the faucet and to prevent the cracking thereof due to the constant moisture of the interior of the same. This casing as will be noted in Fig. 1, is not the full length of the shank *a*, but admits of the part 18 being uncovered, which part is inserted in the wine barrel. Upon the larger end of the casing a cap 19 is screw-threaded and secures the casing upon the faucet. This cap is provided with an aperture 20 which admits of the screw 11 being regulated without removing the casing or cap.

What is claimed as new is:

A faucet comprising a shank portion and a cock, a roller vertically mounted in the shank and adapted to bear against the cock, a ball positioned within the shank, a spring causing the ball to bear the roller against the cock, a casing surrounding the faucet, and a cap for securing the casing in position.

In testimony whereof I affix my signature in presence of two witnesses.

HENRY LUFT.

Witnesses:
JOHN C. DONEGAN,
JEAN BATES.